United States Patent [19]

Mercuri et al.

[11] Patent Number: 4,526,834
[45] Date of Patent: Jul. 2, 1985

[54] NUCLEAR GRAPHITE

[75] Inventors: Robert A. Mercuri, Seven Hills; John M. Criscione, Parma, both of Ohio

[73] Assignee: Union Carbide Corporation, Danbury, Conn.

[21] Appl. No.: 562,562

[22] Filed: Dec. 19, 1983

[51] Int. Cl.³ .................................................. B32B 9/00
[52] U.S. Cl. ..................................... 428/408; 428/323; 428/338; 264/259; 427/113; 427/223
[58] Field of Search .................................. 428/323, 408

[56] References Cited

U.S. PATENT DOCUMENTS 3,393,085  7/1968  Howard et al. ....................... 428/338
4,332,856  6/1982  Hsu ..................................... 428/408

Primary Examiner—Patricia C. Ives
Attorney, Agent, or Firm—John C. LeFever

[57] ABSTRACT

A high strength, high coefficient of thermal expansion fine-grained isotropic graphite article produced from 30% to 70% of attritor milled gilsonite coke or other high CTE carbon filler particles and minor amounts of a binder such a coal tar pitch and petroleum pitch, the article being formed by warm isostatic molding at a temperature of between 50° C. and 70° C. under a pressure between 100 and 1000 psi for a time between 1 and 10 minutes. The particle size of the fillers ranges up to 150 microns.

3 Claims, No Drawings

NUCLEAR GRAPHITE

PATENT INFORMATION STATEMENT

U.S. Pat. No. 3,393,085 which is incorporated herein by reference for various process details therein describes thermally stable carbon substrates comprising fine spherical graphite particles having a mesh size of 10 to 150 (Tyler Mesh) with fillers including graphitized gilsonite flour shaped by hot pressing in an electrically and thermally insulate mold and baked. The resulting product is not a fine grained article because of the relative coarseness of the graphite particles.

OBJECTS AND SUMMARY OF THE INVENTION

The main object of the invention is to provide a high strength, high coefficient of thermal expansion (CTE), fine-grain isotropic graphite suitable as a nuclear graphite in high performance applications.

Another object is to provide a fine-grain and more isotropic material than previously available, whose advantages include higher strength and better isotropy than any presently available nuclear graphite.

These objects are attained by the invention in its product aspect in an article containing from 30 to 70 weight percent, preferably 50–65 weight percent, of attritor milled gilsonite coke or other high CTE carbon fillers having a particle size up to 150 microns and preferably up to 75 microns and which is formed by warm isostatic molding.

In its process aspect, the invention comprises the steps of attritor milling high CTE isotropic fillers, preferably gilsonite, and pitch cokes, blending the milled material, mixing with a carbonaceous binder, heating the mixture, cooling the mix, milling the mix, molding the milled mix in an isostatic mold, baking the shape, densifying the baked shape and graphitizing the baked shape in any conventionally known manner.

DISCLOSURE OF BEST MODE

The invention employs a filler material that is noted for producing isotropic properties, "Gilso coke" or gilsonite coke, which had been used for producing what was in the 1960's considered to be an excellent grade of graphite for nuclear applications, specifically where silicon carbide coating were to be applied. Gilsonite coke is an exceptionally hard carbonaceous material with spherically-shaped particles, making it difficult to mill by conventional means without suffering contamination from the milling operation, such as wear particles from the mill itself. The advent of a device called the attritor mill brought to this technology a new milling method that is fast, clean, and efficient with a minimum of contamination of the product. Attritor milling of gilsonite coke produces a fine-grained filler necessary for this process. However, other high CTE isotropic carbonaceous fillers can also be used in this process.

The isostatic forming method used in this process is unique in itself. This forming method increases the density and stength of the product. For comparison purposes, the usual compressive strength of the product of this process is approximately 16,000 psi, as compared with 6,000 to 7,000 psi for standard grade of "nuclear graphite" (AGOT), and 13,000 psi for coarser-grained products made using hot pressing methods at 320° C. and 1,000 psi as is taught in U.S. Pat. No. 3,393,085.

Fine-grain graphites were prepared using Gilso coke and pitch coke fillers. The CTE's were 5.3 and $3.5 \times 10^{-6}/°$ C., respectively, at 100° C. and their anistropy ratios were under 1.07 for all properties. The flexural and compressive strengths were 8024 and 16,772 psi for the Gilso coke filled graphite and 6746 and 12,746 psi for the pitch coke variation.

Other properties are set forth in Table I.

TABLE I

Nuclear Graphite Development
Properties of Gilso and Pitch Coke Base Graphites

|  | Goal | G1-2 | P1-2 |
|---|---|---|---|
| Density gm/cc | 1.81 | 1.86 | 1.85 |
| Tensile Strength psi | 4,600 | 6,695 | 5,520 |
| % Anisotropy | — | 2.2 | 6.6 |
| Tensile Strain % | — | 0.706 | 0.673 |
| % Anisotropy | — | 1.0 | 3.7 |
| Flexural Strength psi | 6,000 | 8,024 | 6,746 |
| % Anisotropy | — | 2.2 | 5.9 |
| Compressive Strength psi | 13,000 | 16,772 | 12,746 |
| % Anisotropy | — | 4.2 | 0.3 |
| CTE × $10^{-6}$/°C. 20–120° C.* | 4.5 | 5.3 | 3.5 |
| % Anisotropy | — | 0.8 | 6.7 |
| Thermal Diffusivity mm$^2$/sec | — | 85.7 | 94.4 |
| % Anisotropy | — | 0 | 3.4 |
| Permeability N$_2$ millidarcys | — | .0028 | .0010 |
| % Anisotropy | — | 22 | 20 |
| Hardness Rockwell E | — | 70 | 52 |
| % Anisotropy | — | 1.4 | 0 |
| Pore Volume cc/cc of G | 0.11 | 0.13 | 0.11 |
| Ash ppm | 200 | 400 | 300 |

*Calculated based on 2000° C. data and UCC Handbook

The process steps are detailed below:

I. Filler Preparation—High CTE Isotropic Fillers Such as Gilso and Pitch Coke.
 (a) Attritor mill coke to fine flour
 (b) Screen out particles greater than 75 microns (200 mesh)*
*All Screen Sizes, unless otherwise stated, are U.S. Standard
 (c) Remill oversize
 (d) Remove magnetic impurities
 (e) Blend coke
II. Mix Binder and Filler
 (a) Determine binder level
 (b) Heat and mix correct proportions of binder and filler
 (c) Cooling the resulting mix
III. Mill Cooled Mix
 (a) Mill mix
 (b) Screen through −100 mesh
 (c) Remill oversize particles
 (d) Blend
 (e) Remove magnetic impurities
IV. Form
 (a) Load isostatic mold
 (b) Preheat
 (c) Mold
V. Bake
VI. Densify
 (a) Pitch impregnation
 (b) Bake
 (c) Pitch Impregnation
VII. Graphitization
 (a) Carried out in conventional manner Additional details of the process steps are set forth below:

FILLER FLOUR PREPARATION

Milling problems which may be encountered on producing an 85 to 95* flour from the extremely hard filler cokes (Gilso and pitch coke) employed in the invention are solved by using an attritor mill, which achieves dry grinding in a stationary tank by means of a rotating shaft with arms that agitate the grinding media into a random state of motion of internal porosity forcing the grinding media to impinge and reduce particle size of the material. Milling to a 90 flour was accomplished on a Union Process, Inc. 30S (52 gallon) dry batch attritor. The attritor consisted of a stationary cylindrical vessel in which the produce and ⅜-inch diameter steel balls were agitated by means of a rotating center shaft with arms. A 135-lb batch of crushed pitch coke was milled for 20 minutes, while Gilso coke required 60 minutes of milling time. After running 25 batches, the mill balls remained within the same tolerances as new balls.

*Numbers used throughout this application without units refer to weight percentage through 200 mesh screen.

Eleven milling lots of Gilso coke and 14 of pitch coke resulted in 89 and 91 flours (percent through 200 mesh), respectively. The individual batch analyses are shown in Table I-A.

TABLE I-A

| Milling Lot # | Gilso Coke Percent through | | Pitch Coke Percent through | |
|---|---|---|---|---|
| | 200 Mesh | 400 Mesh | 200 Mesh | 400 Mesh |
| 1 | 85 | 59 | 85 | 54 |
| 2 | 78 | 52 | 95 | 89 |
| 3 | 99 | 87 | 87 | 63 |
| 4 | 90 | 58 | 67 | 42 |
| 5 | 60 | 41 | 93 | 66 |
| 6 | 100 | 89 | 96 | 73 |
| 7 | 100 | 95 | 95 | 69 |
| 8 | 100 | 99 | 93 | 67 |
| 9 | 65 | 42 | 96 | 76 |
| 10 | 100 | 85 | 94 | 68 |
| 11 | | | 92 | 67 |
| 12 | | | 95 | 76 |
| 13 | | | 98 | 80 |
| 14 | | | 89 | 66 |
| Average | 88 | 71 | 91 | 68 |

The attritor milled cokes were screened to −200 mesh and blended to yield uniform lots of Gilso and pitch coke 100 flours. The average particle size distribution of the screened and blended flours are shown in Table II.

TABLE II

| | Filler Flours - Particle Size Distribution | |
|---|---|---|
| Size Fraction | Pitch Coke 6 Drum Avg. | Gilso Coke 3 Drum Avg. |
| −200 on 270 mesh | 3.1 | 1.4 |
| −270 on 400 mesh | 9.2 | 5.5 |
| −400 mesh | 87.8 | 93.0 |
| −15 microns | 46.3 | 48.5 |

MIX PREPARATION

The 100 flour cokes were mixed with milled binder pitch (67 flour) in an oil heated Sigma blade mixer. The mixes each contained 200 lbs of filler flour and a sufficient quantity of binder. Each mix was heated slowly, over a period of about two hours, to a temperature of 160° C., and then discharged and cooled. The mix compositions are shown in Table III. Binder levels of 52.5, 55, and 57.5 pph filler were used for the pitch coke and 60, 62.5, an 65 pph for the Gilso coke. The cooled mixes were crushed, milled, and screened to yield molding particles 100% through 100 mesh. The particle size distribution of the six mixes are shown in Table IV.

TABLE III

| | Mix Particle Composition | | | | | |
|---|---|---|---|---|---|---|
| Particle Size | Pitch Coke | | | Gilso Coke | | |
| Coke | −200 | | | −200 | | |
| Pitch % −200 | 67 | | | 67 | | |
| Mix Formulation | P1 | P2 | P2 | G1 | G2 | G3 |
| Coke lbs. | 200 | 200 | 200 | 200 | 200 | 200 |
| Pitch lbs. | 105 | 110 | 115 | 125 | 130 | 120 |
| Binder level pph | 52.5 | 55.0 | 57.5 | 62.5 | 65.0 | 60.0 |

TABLE IV

| | Filler-binder Mix Particles - Size Distribution | | | | | |
|---|---|---|---|---|---|---|
| | Percent Through | | | | | |
| Screen Size | P1 | P2 | P3 | G1 | G2 | G3 |
| −400 mesh | 47.4 | 35.9 | 47.4 | 48.0 | 51.1 | 50.7 |
| −200 + 400 | 27.5 | 20.9 | 30.7 | 24.0 | 25.2 | 27.5 |
| −140 + 200 | 12.4 | 14.3 | 12.7 | 13.8 | 12.4 | 13.8 |
| −100 + 150 | 12.6 | 28.9 | 10.4 | 13.3 | 11.3 | 8.8 |
| Oversize | 1 | 0 | 0 | 0 | 0 | 0 |
| Binder pph | 52.5 | 55.0 | 57.5 | 60.0 | 62.5 | 65.0 |

*All were random samples taken after magnetic separation and drum blending.

FORMING

Seventy pounds of molding particles were loaded into a 14-inch diameter×16-inch long flexible mold which was then evacuated and sealed. Three such assemblies were placed in a 24-inch diameter×84 inch deep water-filled autoclave, and held at 62° C. for 16 hours. The system was then pressured to 1000 psi over a period of approximately 15 minutes and held at pressure for five minutes. The molds were then removed from the autoclave, the flexible tooling stripped from the cylinders, and the cylinders were cooled to room temperature under ambient conditions. After compression, the billets were approximately 11.5 inch diameter×12.5 inch long.

The pitch coke primary particles were formed to a green density averaging 1.58 g/cc at all three binder levels. The Gilso coke base billets were formed to a density of 1.45 g/cc at the lower binder level.

BAKING

The billets were sagger baked in coke and sand pack using the schedule shown in Table V. The load was topped with 30 inches of coke and sand and two-inch layers of charcoal, green mix, and sand. Three layers of seven billets each were held in a 48-inch diameter sagger. All of the billets shrunk in bake. Typically, the greatest diameter changes were in the top layer and the greatest length changes were in the bottom layer of the sagger.

The low binder level (52.5 pph) pitch coke billets and the 62.5 pph binder level Gilso coke billets survived the baking process.

TABLE V

Baking Schedules

First Bake
To 750° C. Hold 24 Hours
Rebake 1
To 850° C.
Rebake 2
To 600° C.
Graphitization
To 2800° C. Hold 4 hours The changes in the volume and weight in going from the green to the first bake condition of the successfully processed billets are shown in Table VI. The data are based on measurements of the as-formed surfaces which are less accurate than subsequent measurement on machine surfaces. The weight and volume changes during the baking of the pitch coke base billets were similar, therefore, their average density, 1.55 g/cc, was unchanged in going from the green to the baked state. Greater shrinkage in the baking of the Gilso coke base billets led to an increase of about two points in density to an average of about 1.48 g/cc.

TABLE VI

Nuclear Graphite Development
Changes During Processing of Pitch
and Gilso Coke Base Graphites

| Billet Number | Green Density gm/cc | Green to Bake V −% | Green to Bake W −% | First PI % Pickup | Second PI % Pickup | Shrink In Graph V % | Final Density gm/cc |
|---|---|---|---|---|---|---|---|
| P1-2 | 1.55 | 8.4 | 7.56 | 16.8 | 11. | 7.1 | 1.85 |
| P1-3 | 1.57 | 8.5 | 7.62 | 16.4 | 11.1 | 6.9 | 1.85 |
| G1-1 | 1.45 | 10.1 | 7.79 | 19.2 | 13.1 | 12.0 | 1.85 |
| G1-2 | 1.43 | 10.5 | 7.56 | 18.9 | 12.9 | 12.0 | 1.86 |
| G1-3 | 1.49 | 10.0 | 7.73 | 17.3 | 11.9 | 12.0 | 1.87 |

IMPREGNATIONS

The bake billets were machined to uniform diameter and length and impregnated using a coal tar pitch in a conventional process. The billets were placed in an autoclave under molten pitch at a pressure of 100 psi and a temperature of 150° C. for 20 hours to effect impregnation. The pitch pickup averaged 16.6 w/o for the pitch coke base product and 18.5 w/o for the less dense Gilso coke base material. Subsequent to a sagger rebake to 900° C. (using the conditions shown in Table V), the products averaged 1.68 and 1.61 g/cc in density, an increase of about 9% as compared to the baked density shown in Table VI.

The second impregnation was run in a manner identical to the first. The pickups averaged 11.1 and 12.6 w/o for the pitch and Gilso coke base cylinders, respectively.

GRAPHITIZATION

The second rebake and graphitization schedules are also included in Table V. The cylinders were induction graphitized, two in a furnace, to a final temperature of 2800° C. Significant shrinkage, 7 v/o for the pitch coke and 12 v/o for the Gilso coke base billets resulted in average product densities of 1.85 g/cc, respectively.

PRODUCT CHARACTERIZATION

Nondestructive Testing

The graphitized products, cylinders P1-2, P1-3, made using pitch coke, and G1-1, G1-2, and G1-3 made using Gilso coke, were examined using X-ray radiography and sonic techniques. X-ray radiographs were evidence of structural uniformity. The ratios of the sonic velocities in the axial and radial directions were 1.023 and 1.010 for the pitch coke and Gilso coke base cylinders, respectively. The sonic transit time data, shown in Table VII, are clear evidence of the isotropy and the homogeneous nawture of both types of graphite.

TABLE VII

Nuclear Graphite Development
Full Billet Sonic Transit Time (STT)*

| Cylinder Number | Location | STT Length Microsec | STT Dia. Microsec | $Vel_l$ m/sec | $Vel_d$ m/sec |
|---|---|---|---|---|---|
| G1-3 | 1 | 103 | 93 | 2730 | 2770 |
| | 2 | 104 | 94 | 2700 | 2740 |
| | 3 | 103 | 94 | 2730 | 2740 |
| | 4 | 103 | 94 | 2730 | 2740 |
| | 5 | 104 | 94 | 2700 | 2740 |
| | 6 | — | 93 | — | 2770 |
| average | — | — | — | 2718 | 2746 |
| P1-3 | 1 | 116 | 100 | 2490 | 2530 |
| | 2 | 116 | 100 | 2490 | 2530 |
| | 3 | 117 | 99 | 2470 | 2560 |
| | 4 | 116 | 100 | 2490 | 2530 |
| | 5 | 118 | 100 | 2440 | 2530 |
| | 6 | — | 99 | — | 2560 |
| average | — | — | — | 2476 | 2535 |

*Five measurements in axial direction, six measurements in radial direction.

DESTRUCTIVE TESTING

A three-inch thick cylinder of material was removed from billets numbered P1-2 and G1-2. Twenty tensile strength and strain samples, ten flexural strength, five compressive strength, and samples for thermal conductivity and thermal expansion were taken from both the axial and the perpendicular to the axial directions of each material. Permeability was run on compressive samples and Rockwell hardness on the flexural samples. In addition, ash and mercury porosimetry data were obtained. A summary of the data is shown in Table I.

The properties shown are the high average regardless of sample orientation and the percent difference between the high and the low average. In general, the density and strength properties of both ptich and Gilso coke base graphite far exceeded the goals established at the beginning of the program which lead to the subject invention. For example, the density, tensile, flexural, and compressive strength goals were 1.81 g/cc, 1600, 600, and 13,000 psi, respectively. The corresponding averages for the Gilso carbon base graphite were 1.86 g/cc, 6695, 8024, and 16,772 psi. These data emphasize the superior properties of the product of this invention.

We claim:

1. A high strength, high coefficient of thermal expansion, fine-grained isotropic graphite article produced by mixing a high coefficient-of-thermal-expansion, attritor milled isotropic carbon flour with a binder, said flour comprising 30 to 70 weight percent of the mixture and having a particle size up to 75 microns, said binder being selected from the group consisting of coal tar pitches and petroelum pitches; isostatically molding the mixture at elevated temperature; and graphitizing the molded mixture.

2. The article of claim 1 wherein said flour is gilsonite coke flour.

3. The article of claim 2 wherein said isostatic molding is performed at temperature between 50° C. and 70° C. and at pressure between 100 and 1000 psi for from one to ten minutes.

* * * * *

UNITED STATES PATENT AND TRADEMARK OFFICE
CERTIFICATE OF CORRECTION

PATENT NO. : 4,526,834

DATED : July 2, 1985

INVENTOR(S) : Robert A. Mercuri and John M. Criscione

It is certified that error appears in the above-identified patent and that said Letters Patent is hereby corrected as shown below:

Column 3, line 17, following "which the", delete "produce" and substitute therefor -- product--.

Column 4, "Table III", for the 3rd Mix Formulation, delete the second "P2" and substitute therefor --P3--.

Column 6, line 16, following "homogeneous", delete "nawture" and substitute therefor --nature--.

Column 6, line 66, following "both", delete "ptich" and substitute therefor --pitch--.

Signed and Sealed this

Fifteenth Day of October 1985

[SEAL]

Attest:

Attesting Officer

DONALD J. QUIGG

Commissioner of Patents and Trademarks—Designate